United States Patent [19]
Rozman

[11] Patent Number: 6,002,597
[45] Date of Patent: Dec. 14, 1999

[54] SYNCHRONOUS RECTIFIER HAVING DYNAMICALLY ADJUSTABLE CURRENT RATING AND METHOD OF OPERATION THEREOF

[75] Inventor: Allen F. Rozman, Richardson, Tex.

[73] Assignee: Lucent Technologies Inc., Murray Hill, N.J.

[21] Appl. No.: 09/247,006

[22] Filed: Feb. 8, 1999

[51] Int. Cl.$^6$ .................................................. H02M 3/335
[52] U.S. Cl. ................................ 363/21; 363/89; 363/127
[58] Field of Search ................................. 363/21, 89, 127

[56] References Cited

U.S. PATENT DOCUMENTS

| | | | |
|---|---|---|---|
| 4,899,271 | 2/1990 | Seiersen | 363/126 |
| 5,274,543 | 12/1993 | Loftus, Jr. | 363/127 |
| 5,291,382 | 3/1994 | Cohen | 363/16 |
| 5,303,138 | 4/1994 | Rozman | 363/21 |
| 5,434,768 | 7/1995 | Jitaru et al. | 363/21 |
| 5,528,482 | 6/1996 | Rozman | 363/21 |
| 5,590,032 | 12/1996 | Bowman et al. | 363/15 |
| 5,636,116 | 6/1997 | Milavec et al. | 363/89 |
| 5,734,563 | 3/1998 | Shinada | 363/21 |
| 5,742,491 | 4/1998 | Bowman et al. | 363/21 |
| 5,870,299 | 2/1999 | Rozman | 363/127 |

Primary Examiner—Shawn Riley

[57] ABSTRACT

A synchronous rectifier, a method of operating the same and a power converter incorporating the synchronous rectifier or the method. In one embodiment, the synchronous rectifier includes: (1) a plurality of parallel-coupled active rectifier circuits, each of the plurality of active rectifier circuits having first and second rectifier switches coupled to corresponding first and second voltage limiting switches and (2) a controller, coupled to the plurality of active rectifier circuits, that senses a through-current of the rectifier and employs the voltage limiting switches to disable corresponding ones of the plurality of active rectifier circuits as the through-current decreases to enhance an operating efficiency of the synchronous rectifier.

24 Claims, 3 Drawing Sheets

SYNCHRONOUS RECTIFIER HAVING DYNAMICALLY ADJUSTABLE CURRENT RATING AND METHOD OF OPERATION THEREOF

BACKGROUND OF THE INVENTION

A power converter is a power processing circuit that converts an input voltage waveform into a specified output voltage waveform. In many applications requiring a DC output, switched-mode DC-DC converters are frequently employed to advantage. DC-DC converters generally include an inverter, a transformer having a primary winding coupled to the inverter and a rectifier coupled to a secondary winding of the transformer. The inverter generally includes a switching device, such as a field-effect transistor (FET), that converts the DC input voltage to an AC voltage. The transformer then transforms the AC voltage to another value and the rectifier generates the desired DC voltage at the output of the DC-DC converter.

Conventionally, the rectifier includes passive rectifying devices, such as Schottky diodes, that conduct the load current only when forward-biased in response to the input waveform to the rectifier. Passive rectifying devices, however, cannot achieve forward voltage drops of less than about 0.35 volts, thereby substantially limiting a conversion efficiency of the DC-DC converter. To achieve an acceptable level of efficiency, DC-DC converters that provide low output voltages (e.g., 1 volt) often require rectifying devices that have forward voltage drops of less than about 0.1 volts. The DC-DC converters, therefore, generally use synchronous rectifiers. A synchronous rectifier replaces the passive rectifying devices of the conventional rectifier with an active rectifier circuit having first and second rectifier switches, such as FETs or other controllable switches, that are periodically driven into conduction and non-conduction modes in synchronism with the periodic waveform of the AC voltage. The rectifier switches of the active rectifier circuit exhibit resistive-conductive properties and may thereby avoid the higher forward voltage drops inherent in the passive rectifyig devices.

One difficulty with using a rectifier switch (e.g., an n-channel silicon FET) is the need to provide a drive signal that alternates between a positive voltage to drive the rectifier switch into a conduction mode and a zero or negative voltage to drive the rectifier switch into a non-conduction mode. Although a capacitive charge within the rectifier switch may only be 30 to 50 nanocoulombs, the rectifier switch requires a high drive current for a brief period of time to change conduction modes. Typical drive currents may be 10 amperes or greater, lasting for tens of nanoseconds. The need to provide substantial power to the rectifier switch to change conduction modes thus reduces some of the advantages of the synchronous rectifier.

The '138 patent, the '482 patent and the '541 patent all describe the use of the secondary winding of the transformer to directly drive the synchronous rectifier. The recognition of the availability of suitable drive voltages from the secondary winding over the entire switching cycle of the inverter led to the development of self-synchronized synchronous rectifiers as disclosed in the aforementioned patents.

The '032 patent describes the use of extra windings in the transformer and voltage-limiting switches to improve the control of the drive signals. The extra windings are particularly useful when the output voltage is so low that the secondary winding does not develop sufficient voltage to ensure that the rectifier switches are fully driven into the conduction mode. The voltage-limiting switches are useful when the input or output voltages are variable, resulting in wide voltage variations in the drive signals. The extra windings and voltage-limiting switches thus allow the transformer to provide drive signals of sufficient voltage to more efficiently operate the synchronous rectifier.

While the rectifier switch avoids the higher forward voltage drops inherent in passive rectifying devices, the rectifier switch possesses a number of power loss mechanisms. During switching transitions, the body diode of the rectifier switch exhibits conduction losses. Switching losses are also associated with charging and discharging of the parasitic capacitances of the rectifier switch and with reverse recovery of the body diode. Because the input capacitance of a rectifier switch may be its largest parasitic capacitance, the loss associated with charging the input capacitance may be greater than other switching losses.

When the switching frequency of a DC-DC converter is increased to achieve a more compact design, the energy required to charge and discharge the input capacitance of the rectifier switch can result in substantial losses, detracting from, and ultimately limiting, the benefits of the low conduction mode resistance of the rectifier switch. In contrast to the conduction loss, which varies with the square of the load level, the switching loss is typically independent of the output load. Therefore, the switching loss, particularly the switching loss associated with the input capacitance of the switch, has a significant impact on the light load efficiency of the converter.

In many applications wherein the synchronous rectifier is required to drive heavy loads, the active rectifier circuit may not be adequate to efficiently convey the required current. Conventionally, circuit designers have advantageously parallel-coupled a number of active rectifier circuits to increase the current capacity of the synchronous rectifier. At light loads, however, the switching losses attributable to the additional rectifier switches further reduce the efficiency of the power converter.

Accordingly, what is needed in the art is a synchronous rectifier topology capable of reducing the switching loss associated with the input capacitance of the rectifier switches, particularly as the output load is reduced, thereby increasing the efficiency of the converter.

SUMMARY OF THE INVENTION

To address the above-discussed deficiencies of the prior art, the present invention provides a synchronous rectifier, a method of operating the same and a power converter incorporating the synchronous rectifier or the method. In one embodiment, the synchronous rectifier includes: (1) a plurality of parallel-coupled active rectifier circuits, each of the plurality of active rectifier circuits having first and second rectifier switches coupled to corresponding first and second voltage limiting switches and (2) a controller, coupled to the plurality of active rectifier circuits, that senses a through-current of the rectifier and employs the voltage limiting switches to disable corresponding ones of the plurality of active rectifier circuits as the through-current decreases to enhance an operating efficiency of the synchronous rectifier.

The present invention therefore introduces the broad concept of employing voltage limiting switches in the active rectifier circuits within a synchronous rectifier to individually disable the active rectifier circuits, particularly at relatively low through-current levels, and thereby avoid switching losses that would otherwise be incurred were the active rectifier circuits not disabled.

In one embodiment of the present invention, the synchronous rectifier further includes a passive rectifier circuit. The passive rectifier circuit remains in operation at all through-current levels, ensuring that rectification continues.

In one embodiment of the present invention, the first and second rectifier switches are field-effect transistors (FETs). In a related embodiment, the first and second voltage limiting switches are FETs. Those skilled in the pertinent art will understand, however, that the present invention fully encompasses all controllable switches, whether conventional or later-developed.

In one embodiment of the present invention, the controller is embodied in an integrated circuit. Alternatively, the controller can be formed from discrete components and can be analog or digital.

In one embodiment of the present invention, the first rectifier switch and the first voltage limiting switch are embodied in an integrated circuit. Of course, the first rectifier switch and first voltage limiting switch may also be discrete components.

In one embodiment of the present invention, the controller varies control signals to control terminals of the first and second voltage limiting switches based on the through-current. The voltage limiting switches can thus be employed to optimize drive voltage to control terminals of the first and second rectifier switches to compensate for manufacturing variations in threshold voltages.

In one embodiment of the present invention, each of the plurality of active rectifier circuits further has third and fourth rectifier switches coupled respectively to the first and second voltage limiting switches. In fact, each of the plurality of active rectifier circuits can have any number of rectifier switches.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifyng other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
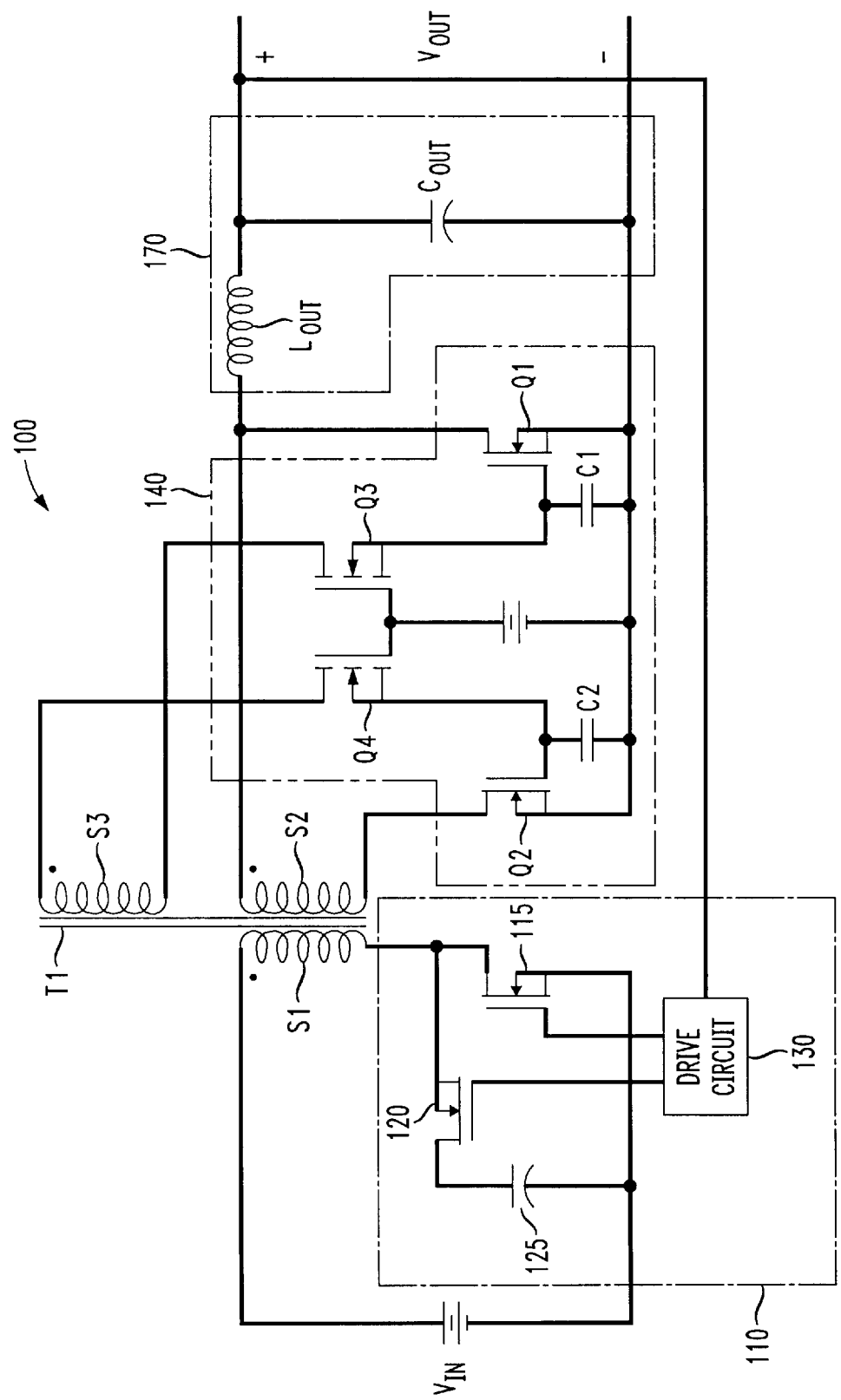
FIG. 1 illustrates a schematic diagram of a power converter of the prior art.

Referring initially to FIG. 1, illustrated is a schematic diagram of a power converter 100 of the prior art. The power converter 100 includes an inverter 110 coupled to an input of the power converter 100. The power converter 100 further includes a transformer T1 having a primary winding S1 coupled to the inverter 110, a secondary winding S2 and an auxiliary winding S3. The power converter 100 further includes a synchronous rectifier 140, coupled to the secondary winding S2, that rectifies a periodic waveform supplied by the secondary winding S2. The power converter 100 further includes an output filter 170, having an output inductor $L_{OUT}$ and an output capacitor $C_{OUT}$, that filters the rectified waveform to supply a DC output voltage $V_{OUT}$ at an output of the power converter 100.

The inverter 110 includes a power switch 115 coupled between the input and the primary winding S1. The power switch 115 alternately conducts to apply an input voltage $V_{In}$ across the primary winding S1. The inverter 110 further includes a series-coupled auxiliary switch 120 and clamping capacitor 125, coupled across the power switch 115, that clamps a voltage across the windings of the transformer T1 when the power switch 115 is not conducting. The inverter further includes a drive circuit 130 coupled to the power switch 115 and the auxiliary switch 120. The drive circuit 130 monitors the DC output voltage $V_{OUT}$ and adjusts the switching cycle of the power and auxiliary switches 115, 120 to regulate the DC output voltage $V_{OUT}$. Those skilled in the art are familiar with conventional inverter topologies and, as a result, the inverter 110 will not be further described.

The synchronous rectifier 140 includes an active rectifier circuit having first and second rectifier switches Q1, Q2, coupled to the secondary winding S2. The first and second rectifier switches Q1, Q2 alternately conduct to rectify the periodic waveform supplied by the secondary winding S2. The first and second rectifier switches Q1, Q2 have intrinsic capacitance therein, explicitly represented in FIG. 1 by first and second capacitors C1, C2, coupled respectively to first and second control terminals of the first and second rectifier switches Q1, Q2. The active rectifier circuit further includes first and second voltage limiting switches Q3, Q4, coupled respectively between the auxiliary winding S3 and the first and second control terminals of the first and second rectifier switches Q1, Q2. The auxiliary winding S3 and the first and second voltage limiting switches Q3, Q4 cooperate to provide drive signals of sufficient voltage to efficiently operate the first and second rectifier switches Q1, Q2, independent of the output voltage of the power converter 100.

The illustrated embodiment of the synchronous rectifier 140 may be adequate for some applications. Many applications, however, may require a synchronous rectifier that is capable of driving heavy loads. The active rectifier circuit may, therefore, be inadequate to efficiently convey the required current. One way to increase both the current capacity and the efficiency of the synchronous rectifier 140 is to employ a number of active rectifier circuits coupled in parallel. Increasing the number of active rectifier circuits, however, also increases the switching losses associated with the charging and discharging of the parasitic capacitances, especially the input parasitic capacitances of the rectifier switches. While the switching losses are tolerable at high current levels, the switching losses may significantly impact the efficiency of the power converter at light loads.

Figure 2:
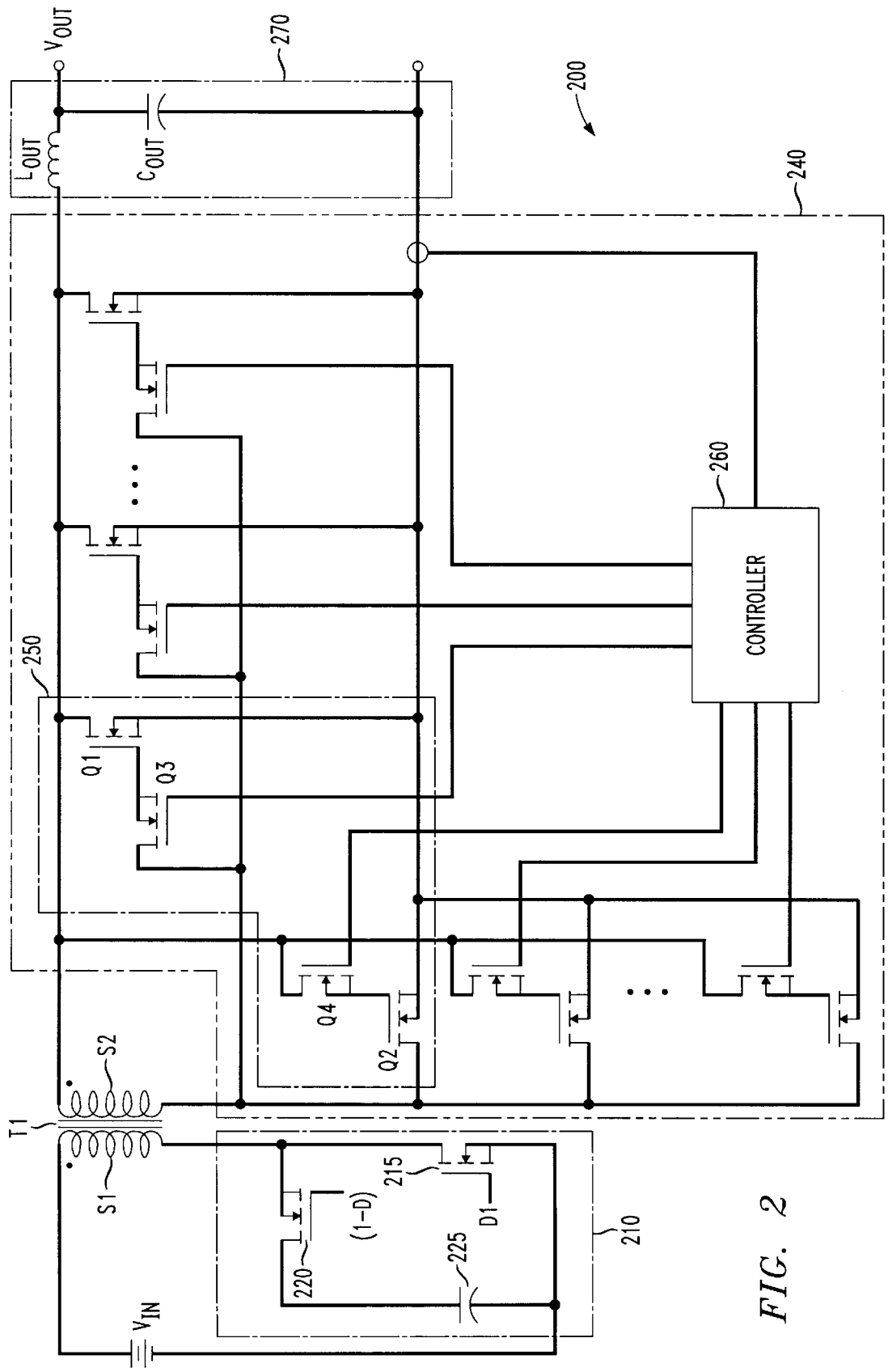
FIG. 2 illustrates a schematic diagram of a power converter constructed in accordance with the principles of the present invention.

Turning now to FIG. 2, illustrated is a schematic diagram of a power converter 200 constructed in accordance with the principles of the present invention. The power converter 200 includes an inverter 210 coupled to an input of the power converter 200. The power converter 210 further includes a transformer T1 having a primary wounding S1 coupled to the inverter 210 and a secondary winding S2. The power converter 200 further includes a synchronous rectifier 240, coupled to the secondary winding S2, that rectifies a periodic waveform supplied by the secondary winding S2. The power converter 200 further includes an output filter 270, having an output inductor $L_{OUT}$ and an output capacitor $C_{OUT}$, that filters the rectified waveform to supply a DC output voltage $V_{OUT}$ at an output of the power converter 200.

In the illustrated embodiment, the inverter 210 includes a power switch 215 coupled between the input and the primary winding S1. The power switch 215 alternately switches to apply a DC input voltage $V_{IN}$ across the primary winding S1. The inverter 210 further includes a series-coupled auxiliary switch 220 and capacitor 225, coupled across the power switch 215, that clamps a voltage across the primary and secondary windings S1, S2 of the transformer T1 when the power switch 215 is not conducting. Those skilled in the art are familiar with conventional inverter topologies and, as a result, the inverter 210 will not be described in detail. Further, while the illustrated embodiment depicts an active clamp forward switching topology, those skilled in the art will realize that the principles of the present invention may be employed with a wide variety of inverter topologies, including, but not limited to, those described herein.

To accommodate heavy loads, the synchronous rectifier 240 includes aplurality of parallel-coupled active rectifier circuits (one of which is designated 250). In the illustrated embodiment, each active rectifier circuit 250 has first and second rectifier switches Q1, Q2 coupled to the secondary winding S2 and to corresponding first and second voltage limiting switches Q3, Q4. While the first and second rectifier switches Q1, Q2 and the first and second voltage limiting switches Q3, Q4 are illustrated as metal oxide semiconductor field-effect transistors (MOSFETs), those skilled in the art will realize that other controllable switches, such as bipolar junction transistors (BJTs) and gallium arsenide field-effect transistors (GaAsFETs), are well within the broad scope of the present invention.

Further, while the first and second rectifier switches Q1, Q2 and the first and second voltage limiting switches Q3, Q4 are illustrated as discrete components, those skilled in the art will realize that the first rectifier switch Q1 and the first voltage limiting switch Q3 may be embodied in an integrated circuit. Similarly, the second rectifier switch Q2 and the second voltage limiting switch Q4 may also be embodied in an integrated circuit. The integrated circuit containing the rectifier switch and voltage limiting switch may occupy less board real-estate than its discrete component counterpart. Further, integrating discrete components into a single device may also reduce manufacturing costs.

The synchronous rectifier 240 further includes a controller 260 coupled to the active rectifier circuits 250. In the illustrated embodiment, the controller 260 is embodied in an integrated circuit. The controller 260, therefore, may be implemented in a compact package. Of course, the controller 260 can be formed from discrete components and can be analog or digital. The controller 260 senses a through-current of the synchronous rectifier 240 and employs the first and second voltage limiting switches Q3, Q4 to respectively disable the first and second rectifier switches Q1, Q2 of the active rectifier circuit 250 as the through-current decreases. Since each active rectifier circuit 250 has rectifier switches and corresponding voltage limiting switches, the controller 260 may employ the voltage limiting switches to disable a number of active rectifier circuits 250. As the rectifier switches of the active rectifier circuits are disabled, switching losses associated with the input capacitances of the disabled rectifier switches are avoided, thereby enhancing an operating efficiency of the synchronous rectifier 240.

In an alternative embodiment of the present invention, the controller 260 may vary the control signals to the control terminals of the first and second voltage limiting switches Q3, Q4 to optimize the drive voltage to the control terminals of the first and second rectifier switches Q1, Q2. The controller may thus compensate for manufacturing variations in the threshold voltages of the first and second rectifier switches Q1, Q2.

While the synchronous rectifier 240 illustrated employs a forward rectifier topology, those skilled in the art will realize that the principles of the present invention may be advantageously employed with other conventional rectifier topologies.

Figure 3:
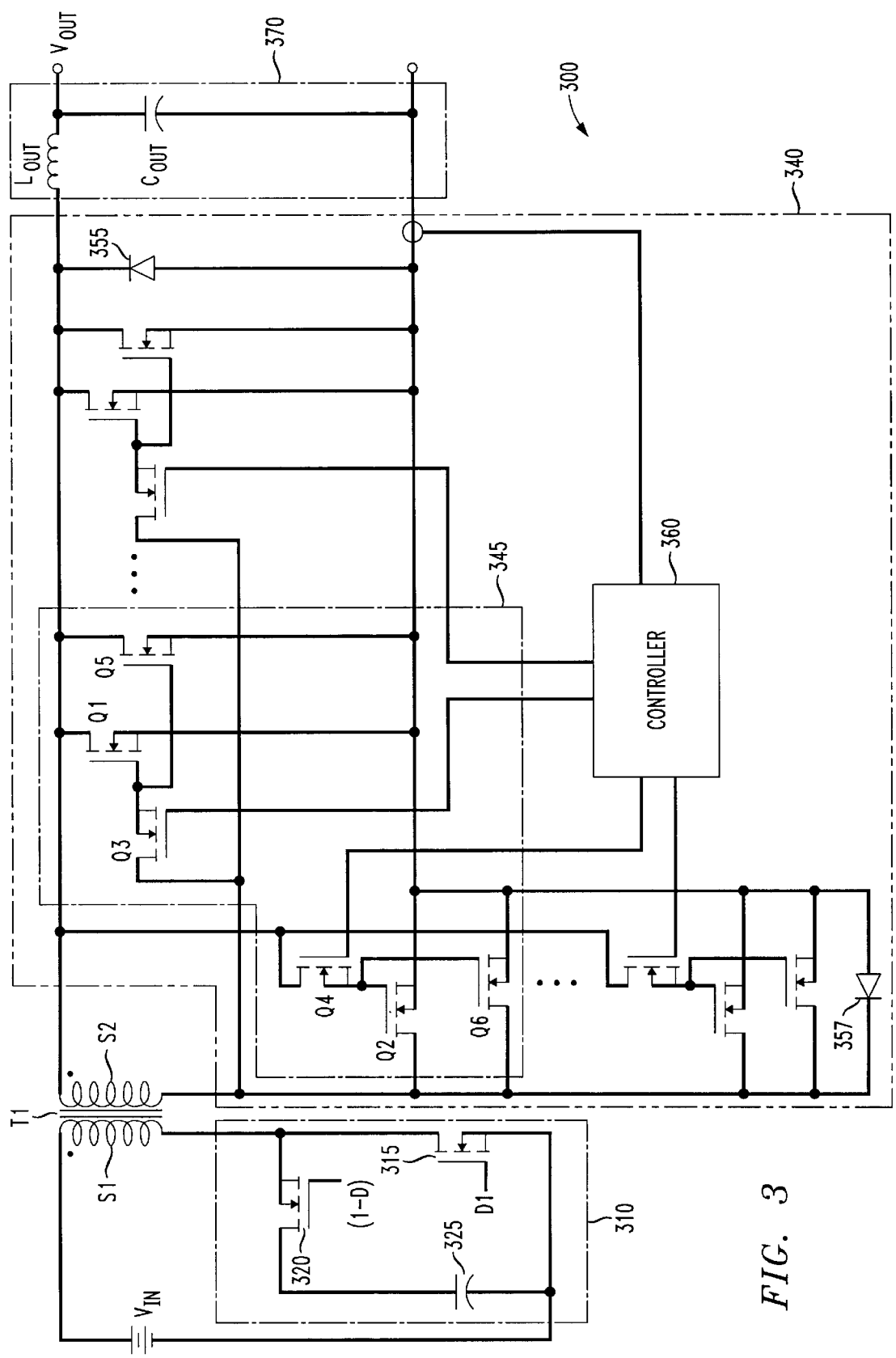
FIG. 3 illustrates a schematic diagram of another power converter constructed in accordance with the principles of the present invention.

Turning now to FIG. 3, illustrated is a schematic diagram of another power converter 300 constructed in accordance with the principles of the present invention.

The power converter 300 includes an inverter 310, having a power switch 315, auxiliary switch 320 and clamping capacitor 325, coupled between an input of the power converter 300 and a primary winding S1 of a transformer T1. The power converter 300 further includes a synchronous rectifier 340, coupled to a secondary winding S2 of the transformer T1. The power converter 300 still further includes an output filter 370, having an output inductor $L_{OUT}$ and an output capacitor $C_{OUT}$, coupled between the synchronous rectifier 340 and an output of the power converter 300. The power converter 300 is analogous to the power converter 200 of FIG. 2 and, as a result, the operation thereof will not be described in detail.

In the illustrated embodiment, the synchronous rectifier 340 includes a number of parallel-coupled active rectifier circuits (one of which is designated 345). The active rectifier circuit 345 has first and second rectifier switches Q1, Q2 and corresponding first and second voltage limiting switches Q3, Q4. The active rectifier circuit 345 further has third and fourth rectifier switches Q5, Q6, coupled respectively to the first and second voltage limiting switches Q3, Q4 and in parallel with the first and second rectifier switches Q1, Q2.

The synchronous rectifier 340 further includes a passive rectifier circuit having first and second passive rectifying devices 355, 357. While the first and second passive rectiying devices 355, 357 are illustrated as diodes, those skilled in the art will realize that the present invention may employ passive rectifying devices other than diodes.

The synchronous rectifier 340 still further includes a controller 360, coupled to the active rectifier circuits 345. The controller 360 monitors a through-current of the synchronous rectifier 340 and enables or disables the first, second, third or fourth rectifier switches Q1, Q2, Q5, Q6 of the active rectifier circuit 345 to enhance an operating efficiency of the synchronous rectifier 340.

Under light load conditions, the controller 360 may actuate the first or second voltage limiting switches Q3, Q4 to disable the first, second, third or fourth rectifier switches Q1, Q2, Q5, Q6 of the active rectifier circuit 345. Further, since the passive rectifier circuit remains in operation at all through-current levels, the controller 360 may disable all of the active rectifier circuits 345. Switching losses attributable to the rectifier switches of the active rectifier circuits 345 may thus be avoided, thereby increasing the light load efficiency of the power converter 300.

Alternatively, the controller 360 may vary the control signals to control terminals of the first or second voltage limiting switches Q3, Q4 based on the through-current. Since switching losses due to the intrinsic input capacitance of the rectifier switches are proportional to the switching voltage, a reduction in the switching voltage will reduce the switching losses. The controller 360 may thus employ the first or second voltage limiting switches Q3, Q4 to reduce the drive voltage to the control terminals of the first, second, third or fourth rectifier switches Q1, Q2, Q5, Q6 to thereby reduce switching losses without disabling the first, second, third or fourth rectifier switches Q1, Q2, Q5, Q6.

Those skilled in the art should understand that the previously described embodiments of the power converter and synchronous rectifier are submitted for illustrative purposes only and other embodiments of the synchronous rectifier capable of providing a dynamically adjustable current rating are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

The principles of the present invention may be applied to a wide variety of power circuit topologies, including circuit topologies not employing an active clamp. Additionally, the principles of the present invention may be applied to various half bridge, full bridge, flyback, and boost converter topologies employing discrete or integrated magnetics. For a better understanding of a variety of power converter topologies employing discrete and integrated magnetic techniques, see *Modern DC-to-DC Switchmode Power Converter Circuits*, by Rudolph P. Severns and Gordon Bloom, Van Nostrand Reinhold Company, New York, N.Y. (1985); and *Principles of Power Electronics*, by John G. Kassakian, Martin F. Schlect and George C. Verghese, Addison-Wesley Publishing Company, Reading, Mass. (1991). The above-listed references are incorporated herein by reference in their entirety.

Circuit topologies employing self driven synchronous rectifiers and which may additionally employ the present invention to advantage include, without limitation, an active clamp, two transformer converter (as described in the '382 patent), a hybridge or current doubler topology (as described in the '271 patent) and an active clamp hybridge circuit (as described in the '768 patent). Multiple output topologies (as described in the '828 patent) and half bridge topologies (as described in the '543 patent) may also use the present invention to advantage.

Additionally, other varieties of active clamp topologies employing self driven synchronous rectification or topologies using rectifiers other than MOSFETs (such as GaAsFETs), as described in the '032 patent and the '138 patent, may use the present invention to advantage.

Although the present invention has been described in detail, those skilled in the art should understand that they can make various changes, substitutions and alterations herein without departing from the spirit and scope of the invention in its broadest form.

What is claimed is:

1. A synchronous rectifier, comprising:
    a plurality of parallel-coupled active rectifier circuits, each of said plurality of active rectifier circuits having first and second rectifier switches coupled to corresponding first and second voltage limiting switches; and
    a controller, coupled to said plurality of active rectifier circuits, that senses a through-current of said synchronous rectifier and employs said voltage limiting switches to disable corresponding ones of said plurality of active rectifier circuits as said through-current decreases to enhance an operating efficiency of said synchronous rectifier.

2. The synchronous rectifier as recited in claim 1 wherein said synchronous rectifier further comprises a passive rectifier circuit.

3. The synchronous rectifier as recited in claim 1 wherein said first and second rectifier switches are field-effect transistors (FETs).

4. The synchronous rectifier as recited in claim 1 wherein said first and second voltage limiting switches are field-effect transistors (FETs).

5. The synchronous rectifier as recited in claim 1 wherein said controller is embodied in an integrated circuit.

6. The synchronous rectifier as recited in claim 1 wherein said first rectifier switch and said first voltage limiting switch are embodied in an integrated circuit.

7. The synchronous rectifier as recited in claim 1 wherein said controller varies control signals to control terminals of said first and second voltage limiting switches based on said through-current.

8. The synchronous rectifier as recited in claim 1 wherein said each of said plurality of active rectifier circuits further has third and fourth rectifier switches coupled respectively to said first and second voltage limiting switches.

9. A method of operating a synchronous rectifier, comprising:
    enabling a plurality of parallel-coupled active rectifier circuits, each of said plurality of active rectifier circuits having first and second rectifier switches coupled to corresponding first and second voltage limiting switches;
    sensing a through-current of said synchronous rectifier; and
    employing said voltage limiting switches to disable corresponding ones of said plurality of active rectifier circuits as said through-current decreases to enhance an operating efficiency of said synchronous rectifier.

10. The method as recited in claim 9 further comprising passing at least a portion of said through-current through a passive rectifier circuit coupled in parallel with said plurality of parallel-coupled active rectifier circuits.

11. The method as recited in claim 9 wherein said first and second rectifier switches are field-effect transistors (FETs).

12. The method as recited in claim 9 wherein said first and second voltage limiting switches are field-effect transistors (FETs).

13. The method as recited in claim 9 wherein said employing is performed by an integrated circuit.

14. The method as recited in claim 9 wherein said first rectifier switch and said first voltage limiting switch are embodied in an integrated circuit.

15. The method as recited in claim 9 wherein said employing includes varying control signals to control terminals of said first and second voltage limiting switches based on said through-current.

16. The method as recited in claim 9 wherein said each of said plurality of active rectifier circuits further has third and fourth rectifier switches coupled respectively to said first and second voltage limiting switches.

17. A power converter, comprising:
    an inverter;
    an isolation transformer coupled to said inverter; and
    a synchronous rectifier, coupled to said isolation transformer and including:

a plurality of parallel-coupled active rectifier circuits, each of said plurality of active rectifier circuits having first and second rectifier switches coupled to corresponding first and second voltage limiting switches, and a controller, coupled to said plurality of active rectifier circuits, that senses a through-current of said synchronous rectifier and employs said voltage limiting switches to disable corresponding ones of said plurality of active rectifier circuits as said through-current decreases to enhance an operating efficiency of said synchronous rectifier.

18. The power converter as recited in claim 17 wherein said synchronous rectifier further comprises a passive rectifier circuit coupled in parallel with said plurality of parallel-coupled active rectifier circuits.

19. The power converter as recited in claim 17 wherein said first and second rectifier switches are field-effect transistors (FETs).

20. The power converter as recited in claim 17 wherein said first and second voltage limiting switches are field-effect transistors (FETs).

21. The power converter as recited in claim 17 wherein said controller is embodied in an integrated circuit.

22. The power converter as recited in claim 17 wherein said first rectifier switch and said first voltage limiting switch are embodied in an integrated circuit.

23. The power converter as recited in claim 17 wherein said controller varies control signals to control terminals of said first and second voltage limiting switches based on said through-current.

24. The power converter as recited in claim 17 wherein said each of said plurality of active rectifier circuits further has third and fourth rectifier switches coupled respectively to said first and second voltage limiting switches.

* * * * *